(12) United States Patent
Segev et al.

(10) Patent No.: US 6,810,523 B2
(45) Date of Patent: Oct. 26, 2004

(54) EFFICIENT THREAD PROGRAMMING USING A SINGLE CALLBACK FUNCTION

(75) Inventors: Danit Segev, Haifa (IL); Gabriel Walder, Kiryat Haim (IL); Yoram Novick, Haifa (IL); Yigal Eisinger, D.N. Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 09/917,720

(22) Filed: Jul. 31, 2001

(65) Prior Publication Data

US 2003/0028684 A1 Feb. 6, 2003

(51) Int. Cl.$^7$ ................................................. G06F 9/54
(52) U.S. Cl. ........................ 719/330; 719/315; 717/124
(58) Field of Search .............................. 719/330, 315, 719/316; 717/106, 124–129, 150–161; 718/104

(56) References Cited

U.S. PATENT DOCUMENTS

| | | | | |
|---|---|---|---|---|
| 5,544,318 A | * | 8/1996 | Schmitz et al. ............. 709/207 |
| 5,974,541 A | * | 10/1999 | Hall et al. ................... 712/228 |
| 6,049,800 A | * | 4/2000 | Govindarajan et al. ....... 707/10 |
| 6,212,657 B1 | * | 4/2001 | Wang et al. ................. 714/746 |
| 6,289,448 B1 | * | 9/2001 | Marsland ....................... 713/2 |
| 6,347,093 B1 | * | 2/2002 | Reine et al. ................. 370/463 |
| 6,678,735 B1 | * | 1/2004 | Orton et al. ................. 709/230 |

FOREIGN PATENT DOCUMENTS

| | | | | | |
|---|---|---|---|---|---|
| JP | 08016431 A | * | 1/1996 | ........... G06F/11/28 |
| KR | 2003035320 A | * | 5/2003 | ........... H04L/12/66 |

* cited by examiner

Primary Examiner—Lewis A. Bullock, Jr.
(74) Attorney, Agent, or Firm—Browdy and Neimark, P.L.L.C.

(57) ABSTRACT

A method that uses a single callback function for a multiphase service with possible discontinuation of execution between the phases. The method is based on assignment of a case in the callback function for each phase or state of the service and a stack of state descriptors. At each call to the callback function, the top descriptor is popped off the stack and the appropriate case in the callback function is run.

18 Claims, 2 Drawing Sheets

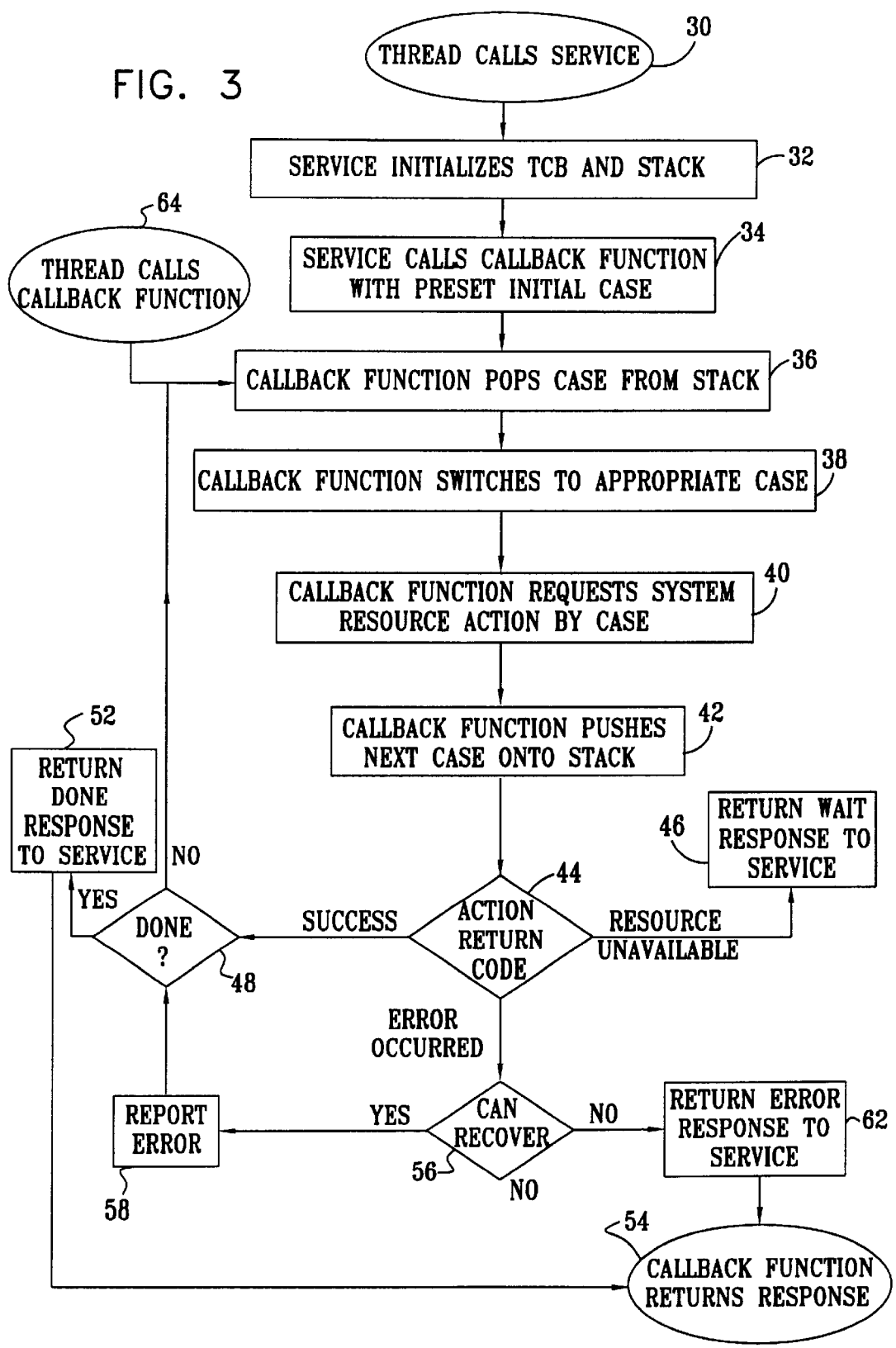

EFFICIENT THREAD PROGRAMMING USING A SINGLE CALLBACK FUNCTION

FIELD OF THE INVENTION

The present invention relates generally to software engineering, and specifically to methods of program control.

BACKGROUND OF THE INVENTION

It is a common occurrence in computer system applications that a program thread must call a service provided by the system. For example, a program thread in a data migration and backup application typically needs to make multiple calls to read/write services on the source and target disks for the application. When the thread calls the service, it typically receives a response indicating whether or not the service is prepared to handle the call. Such a response might be "proceed" if the service completed sucessfully, "wait" if the service is busy handling other requests, or "error" in the case of a fault.

The program thread must be prepared to handle these different sorts of responses in the appropriate way. Continuing with the preceding example, the program thread should respond to "proceed" by continuing the program flow corresponding to a successful completion of the service. When "wait" is returned, the program thread should typically continue with other activities if possible, and then return to request the service again after a certain time has elapsed. Alternatively, the service notifies the program thread subsequently when it has completed the requested steps. In the case of "error," the thread should report the problem to the user or take other corrective action as appropriate.

The accepted way of handling these multiple cases is to define a separate callback function for handling each phase or state of the service, with each callback returning a code such as "proceed," "wait" or "error." This approach is conceptually straightforward, but in complex system applications, it leads to correspondingly complex program structures, with many different types of callbacks. This proliferation of non-uniform callback functions creates difficulties in writing and debugging the application software.

SUMMARY OF THE INVENTION

In preferred embodiments of the present invention, a single callback function is provided for use by a program thread in invoking a system service. The callback function contains multiple cases, each corresponding to a different state of the service. The service state is typically indicated by a return code that is returned by the service when it is invoked. The callback function uses a stack of case values to keep track of the state of the service. Whenever the function is called, it pops the most recent value from the stack in order to determine the current state of the service and, accordingly, to select the appropriate case to run using a case switch. In the course of running the selected case, the function typically pushes a new case value onto the stack, in order to indicate the next case to be selected.

The multi-case callback function structure of the present invention thus provides a uniform framework for all callbacks connected with a given service, eliminating the need to write a separate callback function for each possible state of the service or system. This framework can be used to create callback functions for substantially all of the system services that are to be invoked by an application, enabling the application to be structured and programmed in an orderly and transparent manner. Applications that are programmed in this manner are also easy to debug, by using a trace file of the interactions of the callback function with the pointer stack to follow the program flow in runtime.

There is therefore provided, in accordance with a preferred embodiment of the present invention, a method for invoking a service on a host processor in a computer-controlled system, including:

providing a single callback function having multiple cases, each such case corresponding to a state of the service;

creating a stack in a memory of the host processor, the stack containing one or more state descriptors indicative of the state of the service;

calling the function on the host processor in order to invoke the service;

responsive to calling the function, popping one of the state descriptors from the stack so as to determine the state of the service; and running the case in the callback function that corresponds to the determined state.

Preferably, running the case includes pushing a further one of the descriptors onto the stack for use in determining the case in the single callback function that is to be run next. More preferably, calling the function includes requesting access to a resource of the system, and running the case includes running code so as to access the resource. Further preferably, running the case includes returning a code indicative of an outcome of the access. Most preferably, to branch from one case to another, a next one of the descriptors is popped from the stack and the case that corresponds to the next popped descriptor is run.

Preferably, calling the function includes calling a wrapper function when the service is invoked by a process thread, and the wrapper function pushes a first one of the descriptors onto the stack to be popped by the single callback function.

There is also provided, in accordance with a preferred embodiment of the present invention, computing apparatus, including:

a memory, arranged to store a stack containing one of more state descriptors indicative of a state of a service in a computer-controlled system; and a host processor, which is arranged to invoke the service by calling a single callback function having multiple cases corresponding to the state of the service, such that responsive to calling the function, the processor pops one of the descriptors is popped from the stack so as to determine the state of the service, and runs the case in the callback function that corresponds to the determined state.

There is additionally provided, in accordance with a preferred embodiment of the present invention, a computer software product, comprising a computer-readable medium in which program instructions are stored, the instructions comprising a single callback function having multiple cases, each such case corresponding to a state of a service in a computer-controlled system, which instructions, when read by a computer, cause the computer to store a stack containing one of more state descriptors indicative of the state of the service, to invoke the service by calling the callback function, such that responsive to calling the function, one of the descriptors is popped from the stack so as to determine the state of the service, and to run the case in the callback function that corresponds to the determined state.

The present invention will be more fully understood from the following detailed description of the preferred embodiments thereof, taken together with the drawings in which:

BRIEF DESCRIPTION OF THE DRAWINGS

FIG. 3 is a flow chart that schematically illustrates a method for invoking a system service using a callback function, in accordance with a preferred embodiment of the present invention.

DETAILED DESCRIPTION OF PREFERRED EMBODIMENTS

Figure 1:
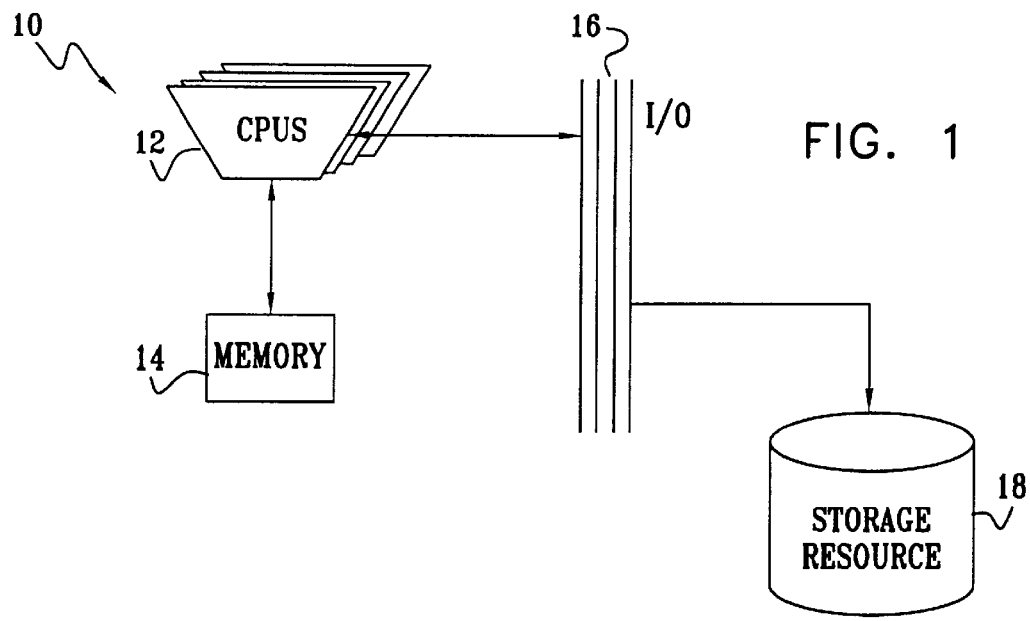
FIG. 1 is a block diagram that schematically illustrates a computer system in which a callback function is used to invoke a system service, in accordance with a preferred embodiment of the present invention.

FIG. 1 is a schematic diagram of computer system 10, in accordance with a preferred embodiment of the present invention. System 10 comprises one or more central processing units 12 (CPUs) which is programmed to carry out various functions, some of which are described below. The CPUs utilize a memory unit 14 for temporary storage of data and commands. Throughout the processing of the various functions, it becomes necessary to access scarce system resources. For example, CPUs 12 can read and write across an input/output (I/O) bus 16 to a long-term storage resource 18. Typically, only one process at a time can read and write across I/O bus 16, and the speed of access to storage resource 18 is much slower than the speed of the CPUs. Additionally, each request for a system resource access comprises many steps. Writing to a storage resource, for example, comprises obtaining exclusive access to the resource, sending the information to be written to the resource, checking that no errors occurred, and releasing the exclusive access. One of the steps may not succeed, because of a system failure or because the resource is busy handling other requests.

A method of scheduling use of the system resources must take into account that many fast processes running in different threads or on different CPUs 12 in a SMP (symmetric multiprocessor) system may simultaneously request the same system resource. A scheduling process in system 10, henceforth referred to as a service, receives and handles requests from a process thread running on CPUs 12 to access system resources, such as storage resource 18. An example of such a service is a copy service, used to make copies of data in storage resource 18. The service also coordinates the steps involved in properly accessing the resource, and informs the process threads of any problems. The service is implemented by suitable software running on system 10, possibly in cooperation with other systems. The software may be supplied to the appropriate systems in electronic form, by downloading over a network, for example, or it may alternatively be supplied on tangible media, such as CD-ROM or non-volatile memory.

Figure 2:
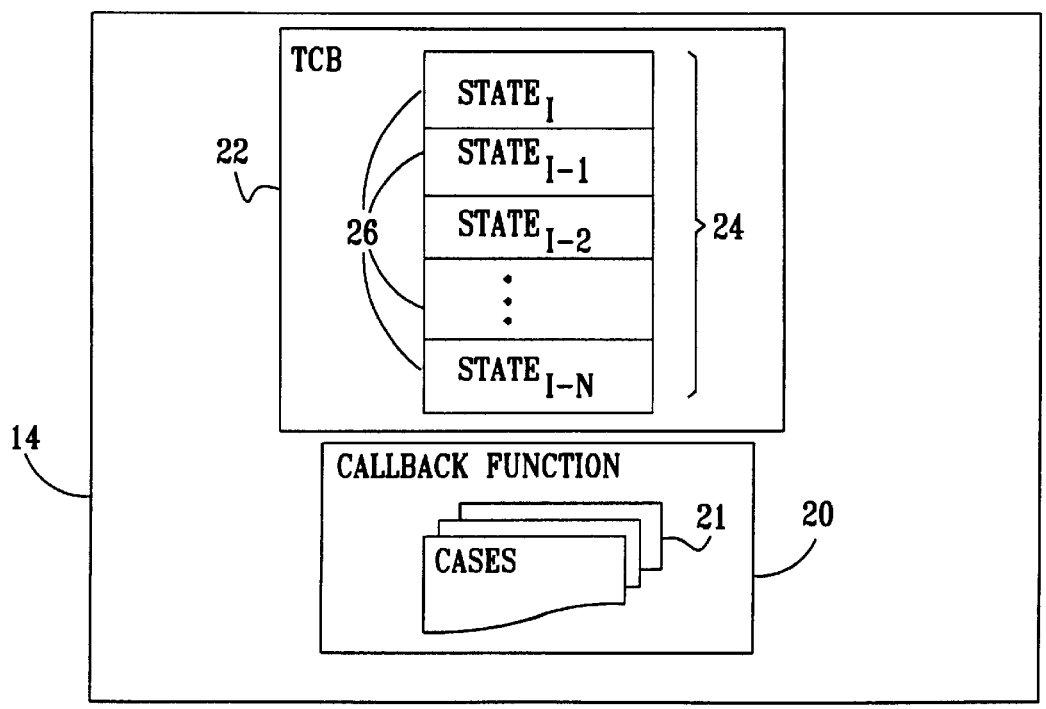
FIG. 2 is a block diagram that schematically illustrates data structures in a computer memory that are used by a callback function, in accordance with a preferred embodiment of the present invention.

FIG. 2 is a block diagram that schematically illustrates data structures in memory 14 used by the service, in accordance with a preferred embodiment of the present invention. In response to service requests from process threads on CPUs 12, the service invokes a callback function 20. The callback function comprises procedures for each of a plurality of cases 21, corresponding to different possible steps in completing system resource 18 access such as:

allocating space for structures in memory,
locking access to the system resource,
writing to the system resource,
unlocking access to the system resource,
checking for write errors,
freeing the allocated memory.

Execution of each case can result in one of a plurality of results. In the present example, the possible results are as follows:

Proceed result—The requested step in the access of system resource 18 was completed as requested.

Wait result—The requested step in the access of system resource 18 could not be completed, but was queued for execution.

Error result—The requested step was rejected.

Callback function 20 utilizes a Task Control Block (TCB) 22, comprising a last-in-first-out (LIFO) stack 24. Each element of stack 24 comprises a state value 26. State value 26 indicates to the callback function which particular stage of the system resource access is next to execute, and thus tells the callback function which of cases 21 to invoke. TCB 22 is a structure that comprises additional information necessary to complete each stage of the system resource access. In the present example, TCB 22 comprises the device number of the storage resource to be accessed, the length of the user data to be written to the resource, and a pointer to the user data. The first element of stack 24 is given the subscript I. Subsequent elements are counted backwards, with consecutive subscripts I-1, I-2 until the final element I-N, wherein N+1 is the number of elements, or length, of stack 24. Pushing an element onto the stack refers to adding it to the stack at position I. Popping an element from the stack refers to removing the element at the top of the stack (initially position I).

Reference is now made to FIG. 3, which schematically illustrates invocation of a service, such as the copy service described above, using callback function 20, in accordance with a preferred embodiment of the present invention. Reference is also made to a C language source code listing in an Appendix to this application, which illustrates an exemplary callback function used in the copy service and a wrapper function used to set up the first stage in the resource access. Line numbers mentioned in the description below refer to lines in the code listing. The goal of the copy service is to copy data from location to another. Requests to copy the data, each comprising a command to access system resources, are queued for processing since the time required to write the data to the new location is much longer than the time required to register the request. The queue is implemented in the example as a path of chained requests. Each request is chained to a subsequent request, and the entire chain forms a path through the different requests. A process thread on CPUs 12 calls the copy service, at a service call step 30 in FIG. 3 (corresponding to calling wrapper function csEstablishPaths at line 17 in the code listing). At an initialization step 32 (lines 32 to 47), the wrapper function fills information into TCB 22, which is necessary to enable the service to complete the system resource access. In the example of storage resource 18, the TCB comprises information on the destination label of the storage device, whether to read or to write data, the size of the data chunk to read/write, and a sequence number of the chunk of data to be read or written relative to other data. The wrapper function verifies the correctness of the data, then pushes the first state value 26 onto the stack at line 49.

The wrapper function calls the callback function at a calling step 34 (line 50). The callback function initializes its data structures, then pops an element from the stack at a stack pop step 36 (line 117).

At function switch step 38, value 26 of the popped element is used as the case in a case switch (line 128). The case switch directs the callback function to the proper case 21 for that value. The different cases are enumerated in lines 129–237 of the code. The cases executed responsive to state values 26 correspond to the following steps in the copy process:

- Case CONTROL_STEP_1 and CONTROL_STEP_2: filling fields in the TCBs at lines 129 and 136,
- Case CONTROL_STEP_3: linking the TCBs at line 145 and calling the logical path establishment service,
- Case CONTROL_STEP_4: checking for an error in the establishment of the logical paths on which chains will be executed at line 206,
- Case CONTROL_STEP_5: finalizing TCBs and data for the next step at line 220,
- Case CONTROL_STEP_6: hardening of the path data at line 227, and
- Case CONTROL_STEP_7: TCBs waiting for completion of the current thread at line 237.

As each case is handled, callback function 20 takes appropriate action, depending on the current case, at an action step 40. Each case's action step completes a different step in the total process of accessing the system resource, as enumerated above. A further value 26 corresponding to the case to be selected in the following stage in the system resource access process is pushed onto the stack at a stack push step 42. Alternatively, as exemplified in the code at lines 130 and 131, the order of action step 40 and stack push step 42 may be reversed. Action step 40 returns a code indicating the success of the system operation at a code return step 44. In the exemplary embodiment represented by the Appendix, three possible codes are returned. The resource may be unavailable, in which case the callback function returns a wait response to the service at a return wait response step 46 (line 295 in the callback function and line 63 of the wrapper function).

Alternatively, the system may return a success code. In this case, the callback function checks whether the system resource access is complete at a done test step 48. While the task is not done, the callback function pops the next value 26 from the stack at stack pop step 36 (line 256) and continues with switch step 38 (line 128). If the task is done, the callback function returns a done response to the service at return done state step 52, after first cleaning up the chain of TCB pointers (lines 273 to 289). The callback function then returns a done response directly to the calling thread at a return step 54, utilizing a function pointer located on a global stack (lines 290–292). The function calling the callback function pushes its function pointer onto the global stack prior to calling the callback function. An example of such a push operation is shown in the wrapper function (line 47). The global stack enables the callback function (and through it the service) to return control to the calling function even though the functions may execute in different threads.

Further alternatively, code return step 44 may return an error code. The callback function checks whether it can recover from the error at a recovery test step 56 (line 208). If the callback function can recover from the error, it reports the error at an error reporting step 58 (line 212). The callback function then continues as if the system had returned a success code, at done test step 48. If the callback cannot recover from the error, it cleans up the TCB pointer chain at a return error response step 62, and the callback function then returns an error response directly to the calling thread at return step 54. In this case, there is no need to push a next case onto the stack.

When the thread receives a WAIT response from step 46 or a PROCEED response from step 54 (due to a recoverable error), it can resume the system resource access by directly calling the callback function at a callback function call step 64. Direct callback function call step 64 differs from service call 30 in that the wrapper function is not called. The top element on the stack contains all the information needed by the callback function to resume the system access. The callback function continues at stack pop step 36.

Although the preferred embodiment described above relates specifically to a system copy service and a particular callback function associated with that service, the principles of the present invention may similarly be applied to provision of system services of other types, such as disk input/output, data communication protocols, graphic window systems and interlock access to shared resources in multi-CPU systems. Furthermore, while the exemplary code in the Appendix below is written in the C language, it will be appreciated that the invention does not depend on features inherent in the C programming language and could be exploited in other computer programming languages.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

42897S4

APPENDIX

```
1  /* (C) Copyright IBM Corp. 1999, 2000 */
2
3  typedef enum ContextPathsEstablish { CONTROL_STEP_1,
4  CONTROL_STEP_2,   CONTROL_STEP_3,  CONTROL_STEP_4,
5  CONTROL_STEP_5,   CONTROL_STEP_6 , CONTROL_STEP_7,
6  CONTROL_STEP_LAST };
7
8  /*---------------------------------------------------
9  ** Input Parameters:
10 **   struct OsTCB *  pTCBIn  - pointer to the SIO TCB
11 **   UINT16 countIn - Byte count of PSF parameters.
12 **   void *pPSFParmDataIn - PSF parameter area.
13 **   UINT8 lssIdIn       - The logical subsystem number
14 **   PCallback pCallbackIn - Commands callback fnction
15 **--------------------------------------------------*/
16
17 enum CsReturnCode csEstablishPaths
18           struct OsTCB *pTCBIn,
19           UINT16       countIn,
20           void *pPSFParmDataIn,
21           UINT8        lssIdIn,
22           PCallback   pCallbackIn )
23 {
24   CsReturnCode   rc   = CS_ERROR;  /* Return code */
25   CsCUTabsScanResults scanResults;
26   CsTCB        *pCsTCB;
27   CsmgrpathTCB  *pPovl;
28   void   *pCallBack; /* Who to call on ERROR, WAIT?*/
29   BOOL   inputValid = TRUE;
30
31   /* Initialize a TCB and its private data area */
32   pCsTCB = InitializeCsTCB( pTCBIn, lssIdIn,
```

```
                           countIn, (UINT8 *)pPSFParmDataIn);
34    pPovl = InitailizePovl(pCsTCB);
35    inputValid =ValidateInputConditions(pTCVIn,countIn,
36                             pPsfParmDataIn, lssIdIn);
37
38    if( ! inputValid ) {
39      pCsTCB->csStatus = CS_ERROR;
40      cscmBuildSense0F53(pTCBIn );
41      TCB_RESTORE_PREVIOUS_OWNER(COMP_ID, pTCBIn );
42      return CS_ERROR;
43    }
44
45    /* Save pCallbackIn used by detected error. This is
46       one way to achieve exception handling */
47    GLOBAL_STACK_PUSH(COMP_ID, pTCBIn, pCallbackIn );
48
49    CS_PUSH_INDEXCB( pCsTCB, CONTROL_STEP_1 );
50    DoRoutinesWithWaitStates( pTCBIn, CS_PROCEED );
51    rc = pCsTCB->csStatus;
52    if( CS_WAIT != rc ) {
53        /* Processing completed. Clean up. */
54        FreeAllAllocatedStructures(pTCBIn);
55    }
56    break;
57
58    if( ( CS_ERROR == rc ) || ( CS_PROCEED == rc ) )
59    {
60        GLOBAL_STACK_POP(COMP_ID, pTCBIn, pCallBack);
61        TCB_RESTORE_PREVIOUS_OWNER(COMP_ID, pTCBIn);
62    }
63    return rc;
64  }
65
```

```
    4289784

66 /*------------------------------------------------
 67 ** DoRoutinesWithWaitStates is either called by
 68 ** csEstablishPaths or called back after each of the
 69 ** steps which have returned a CS_WAIT. If no CS_WAIT
 70 ** is returned during the entire process, execute all
 71 ** the steps during the first execution call.
 72 **
 73 ** Any relevant information was already saved in
 74 ** the TCB by the csEstablishPaths function.
 75 **-----------------------------------------------*/
 76
 77 void DoRoutinesWithWaitStates( struct OsTCB *pTCBIn,
 78                                enum CsReturnCode rcIn ) {
 79   CsReturnCode  rc       = CS_WAIT;  /* Return code */
 80   CsCUTab      *pCsCUTab = NULL;  /* Ptr to the csCUTab */
 81   ContextPathsEstablish entryPoint ;
 82   OsTCBAllocFlagIn   allocType;
 83   CsTCB *pCsTCB = NULL;   /*Ptr to CS TCB (uarea) */
 84   OsTCB *pPthTCB = NULL;  /*Ptr to Path TCB   */
 85   OsTCB *pChnTCB = NULL;  /*Ptr to Chain TCB */
 86   OsTCB *pSIOTCB = NULL;  /*Ptr to the SIO TCB*/
 87   CsppTCB *pPthUsr = NULL; /*Ptr to Path TCB uarea*/
 88   CsppTCB *pChnUsr = NULL; /*Ptr to Chain TCB uarea*/
 89   CsmgrpathTCB *pPov1=NULL; /*Ptr to MGR Priv. area */
 90   BOOL     cont     = TRUE;
 91   void *pCallBack = NULL;
 92   CsELPList *pELPList = NULL;
 93   UINT8    *pPar    = NULL;
 94   UINT8     pathNum  = 0;  /* Loop index */
 95   UINT32    offset   = 0;  /* temp variable */
 96
 97   /* Determine the type of the TCB */
 98   TCB_QUERY_ALLOC_TYPE( pTCBIn, allocType );
```

```
42897S4

99   if( TCB_PTYPE_IN == allocType ) {
100       /* The TCB is either a pathTCB or a chainTCB */
101       pPthUsr = TCB_COMP_PTR_CSPP( pTCBIn );
102       pSIOTCB = pPthUsr->pOsTCB;
103       pCsTCB  = TCB_COMP_PTR_CS( pSIOTCB );
104  }
105  else if(( TCB_F_TYPE_IN == allocType) ||
106         (TCB_COPY_TYPE_IN == allocType) )
107  {
108      /* The TCB is the SIO TCB */
109      pCsTCB = TCB_COMP_PTR_CS( pTCBIn );
110      pSIOTCB = pTCBIn;
111  }
112
113  pPovl    = &pCsTCB->u.ppath;
114  pPthTCB  = pPovl->ppathTCB;
115  pChnTCB  = pPovl->pchainTCB;
116
117  CS_POP_INDEXCB( pCsTCB, entryPoint );
118  rc = rcIn;
119
120  /*------------------------------------------------
121  **  If processing of any step terminates with an
122  **  error, the function continues to next step to
123  **  analyze the results and to build the sense. The
124  **  return code is set to CS_ERROR .
125  **----------------------------------------------*/
126  while( (cont) && (entryPoint < CONTROL_STEP_LAST) )
127  {
128      switch (entryPoint) {
129      case CONTROL_STEP_1:
130          CS_PUSH_INDEXCB( pCsTCB, CONTROL_STEP_2 );
131          rc = cscmAllocTCB( pSIOTCB, TCB_TYPE_IN,
```

```
4289784

132                        DoRoutinesWithWaitStates);
133        if( CS_WAIT == rc )
134           cont = FALSE;
135        break;
136     case CONTROL_STEP_2:
137        ManipulateTCB2(pPthUsr,pCsTCB,pPovl,pSIOTCB);
138        CS_PUSH_INDEXCB( pCsTCB, CONTROL_STEP_3 );
139        rc = cscmAllocTCB( pSIOTCB, TCB_P_TYPE_IN,
140                           DoRoutinesWithWaitStates);
141        if( CS_WAIT == rc )
142           cont = FALSE;
143        break;
144
145     case CONTROL_STEP_3:
146        ManipulateTCB3(pPthUsr,pCsTCB,pPovl,pSIOTCB);
147        CS_PUSH_INDEXCB( pCsTCB, CONTROL_STEP_4 );
148
149        pChnUsr->pLinkedTCB = pPthTCB;
150        pPthUsr = TCB_COMP_PTR_CSPP( pPthTCB );
151        pPthUsr->pLinkedTCB = pChnTCB;
152
153        /*----------------------------------------
154         ** - Call rc = csdtPathHandler with address
155         **   of pathTCB and the callback function is
156         **   DoRoutinesWithWaitStates.
157         ** DT establishes all the requested paths,
158         ** and returns control to MGR at the end
159         ** of its processing with the establishment
160         ** results saved in the pathTCB.
161         **----------------------------------------*/
162        pPar    = pCsTCB->pInputParm;  /* source */
163        pELPList =  /* dest. */
164        (CsELPList *)&pPthUsr->parListArea.csELPList;
```

```
     42897S4

165
166             pELPList->newValidPaths =
167                      *(pPar+CS_EP_OFF_COUNT);
168             offset = CS_EP_OFF_SAID0; /* begin at first
169                                 SA-ID tag byte */
170             for( pathNum = 0;
171                  pathNum < CS_MAX_LOGICAL_PATHS;
172                  pathNum++ ) {
173                 pELPList->csPath[pathNum].saIDTag =
174                     *(UINT16*)(pPar + offset);
175                 offset += sizeof(UINT16);
176                 pELPList->csPath[pathNum].secAddr =
177                     *(pPar + offset);
178                 offset++;
179                 pELPList->csPath[pathNum].secAddrLSS =
180                     *(pPar + offset);
181                 offset++;
182             }
183
184             /*------------------------------------------
185             ** - If Path establishment is on a new (not
186             **   in use) csCUTab, call PresetCsCUTabPaths
187             ** - Call rc = csdtPathHandler with address
188             **   of pathTCB and the callback function is
189             **   DoRoutinesWithWaitStates.
190             ** DT establishes all the requested paths,
191             ** and returns control to MGR at the end
192             ** of its processing with the establishment
193             ** results saved in the pathTCB.
194             **-----------------------------------------*/
195             if(QUERY_BIT_SET( pPovl->flags,
196                              (UINT8)CS_TCB_ELP_CFG ) )
197                PresetCsCUTabPaths( pPthUsr->pcsCUTab );
```

```
   42897S4

198
199         rc = csdtPathHandler( pPthTCB,
200                               DoRoutinesWithWaitStates);
201
202         if( CS_WAIT == rc )
203            cont = FALSE;
204         break;
205
206      case CONTROL_STEP_4:
207         CS_PUSH_INDEXCB( pCsTCB, CONTROL_STEP_5 );
208         cont=CheckPathEstablishmentErrors(pPthTCB,rc,
209                               DoRoutinesWithWaitStates);
210         if( !cont ) {
211            /* The Path establishment failed. */
212            if( RecoverFromError( pCsTCB ) )
213               rc = CS_PROCEED;
214            else
215               rc = CS_ERROR;
216            cont = TRUE;
217         }
218         break;
219
220      case CONTROL_STEP_5:
221         CS_PUSH_INDEXCB( pCsTCB, CONTROL_STEP_6 );
222         rc = ManipulateTCB5( pCsTCB->lssId, pSIOTCB);
223         if( CS_WAIT == rc )
224            cont = FALSE;
225         break;
226
227      case CONTROL_STEP_6:
228         ManipulateTCB6(pPthUsr,pCsTCB,pPovl,pSIOTCB);
229         CS_PUSH_INDEXCB( pCsTCB, CONTROL_STEP_7 );
230
```

```
       42897S4

231            rc = cscmWriteAndReleaseGS( pSIOTCB,
232                            DoRoutinesWithWaitStates );
233            if( CS_WAIT == rc )
234               cont = FALSE;
235            break;
236
237         case CONTROL_STEP_7:
238            /*-------------------------------------------
239            ** - Push CONTROL_STEP_LAST into the indexCB
240            **   stack in pSIOTCB.
241            ** - Get the pointer to the csCUTab.
242            **-----------------------------------------*/
243            CS_PUSH_INDEXCB( pCsTCB, CONTROL_STEP_LAST );
244            pCsCUTab = CS_CUTAB_POINTER( pCsTCB->lssId,
245                             pPovl->indexCUTab );
246            csmgrODEFreeList( pSIOTCB, pCsCUTab,
247                             DoRoutinesWithWaitStates);
248            break;
249
250         default:
251            break;
252
253      }  /* end switch entryPoint */
254
255      if( cont )
256        CS_POP_INDEXCB( pCsTCB, entryPoint );
257
258   }  /* endwhile */
259
260   pCsTCB->csStatus = rc;
261
262   if( CS_WAIT != rc ) {
263     pPthUsr = TCB_COMP_PTR_CSPP( pPovl->ppathTCB );
```

```
     4289754

264
265    if((((CS_EST_PATH_PARTIAL==pPthUsr->flagsDTtoMGR)||
266        (CS_EST_PATH_FAILED ==pPthUsr->flagsDTtoMGR) )
267       && ( CS_PROCEED == rc ) ) {
268      rc = CS_ERROR;
269      pCsTCB->csStatus = rc;
270    }
271
272    if(entryPoint != CONTROL_STEP_1) {
273       /*-------------------------------------------
274       ** Cleanup the Establish Path operations and
275       ** return results of the Establish Path to
276       ** Commands. Deallocate pathTCB and chainTCB.
277       ** Restore owner of the TCB, since rc is not
278       ** CS_WAIT. Pop Commands callback function
279       ** and call it with pSIOTCB and rc.
280       **----------------------------------------*/
281       if( NULL != pPovl->pchainTCB ) {
282          TCB_FREE(COMP_ID, pPovl->pchainTCB );
283          pPovl->pchainTCB = NULL;
284       }
285
286       if( NULL != pPovl->ppathTCB ) {
287          TCB_FREE(COMP_ID, pPovl->ppathTCB  );
288          pPovl->ppathTCB = NULL;
289       }
290       GLOBAL_STACK_POP(COMP_ID,pSIOTCB,pCallBack);
291       TCB_RESTORE_PREVIOUS_OWNER(COMP_ID,pSIOTCB);
292       ((PCallback)pCallBack)( pSIOTCB, rc );
293     } /* endif not CONTROL_STEP_1 */
294   } /* endif return code is not CS_WAIT */
295   return;
296 } /* end DoRoutinesWithWaitStates   */
```

What is claimed is:

1. A method for invoking a service on a host processor in a computer-controlled system, the method comprising:
providing a single callback function having multiple cases, each such case corresponding to a state of the service;
creating a stack in a memory of the host processor, the stack containing one or more state descriptors indicative of the state of the service;
calling the function on the host processor in order to invoke the service;
responsive to calling the function, popping one of the state descriptors from the stack so as to determine the state of the service; and
running the case in the callback function that corresponds to the determined state.

2. A method according to claim 1, wherein running the case comprises pushing a further one of the descriptors onto the stack for use in determining the case in the single callback function that is to be run next.

3. A method according to claim 2, wherein calling the function comprises requesting access to a resource of the system, and wherein running the case comprises running code so as to access to the resource.

4. A method according to claim 3, wherein running the case comprises returning a code indicative of an outcome of the access.

5. A method according to claim 4, and comprising, in response to the code, popping a next one of the descriptors from the stack and running the case that corresponds to the next popped descriptor.

6. A method according to claim 1, wherein calling the function comprises calling a wrapper function when the service is invoked by a process thread, and wherein the wrapper function pushes a first one of the descriptors onto the stack to be popped by the single callback function.

7. Computing apparatus, comprising:
a memory, arranged to store a stack containing one of more state descriptors indicative of a state of a service in a computer-controlled system; and
a host processor, which is arranged to invoke the service by calling a single callback function having multiple cases corresponding to the state of the service, such that responsive to calling the function, the processor pops one of the descriptors is popped from the stack so as to determine the state of the service, and runs the case in the callback function that corresponds to the determined state.

8. Apparatus according to claim 7, wherein when the processor runs the case in the single callback function, it pushes a further one of the descriptors onto the stack for use in determining the next case in the callback function that is to be run.

9. Apparatus according to claim 8, wherein the service is associated with a system resource, and wherein the single callback function is called so as to provide access to the system resource.

10. Apparatus according to claim 9, wherein the single callback function causes the processor to return a code indicative of the outcome of the access.

11. Apparatus according to claim 10, wherein in response to the code the processor is arranged to pop a next one of the descriptors from the stack so as to determine the state of the service, and to run the case in the single callback function that corresponds to the determined state.

12. Apparatus according to claim 8, wherein the processor is arranged to invoke the service through a wrapper function, which causes the processor to push a first one of the descriptors onto the stack.

13. A computer software product, comprising a computer-readable medium in which program instructions are stored, the instructions comprising a single callback function having multiple cases, each such case corresponding to a state of a service in a computer-controlled system, which instructions, when read by a computer, cause the computer to store a stack containing one of more state descriptors indicative of the state of the service, to invoke the service by calling the callback function, such that responsive to calling the function, one of the descriptors is popped from the stack so as to determine the state of the service, and to run the case in the callback function that corresponds to the determined state.

14. A product according to claim 13, wherein the instructions cause the computer to push a further descriptor onto the stack for use in determining the next case in the single callback function.

15. A product according to claim 14, wherein the service is associated with a system resource, and wherein the instructions cause the computer to request access to a system resource using the single callback function.

16. A product according to claim 14, wherein the instructions cause the processor to return a code indicative of the outcome of the access.

17. A product according to claim 16, wherein in response to the code, the instructions cause the computer to pop one of the descriptors from the stack so as to determine the state of the service, and to run the case in the single callback function that corresponds to the determined state.

18. A product according to claim 14, wherein the instructions further comprise a wrapper function, comprising instructions that cause the computer to push a first one of the descriptors onto the stack previous to invoking the service.

* * * * *